United States Patent [19]

Hood et al.

[11] Patent Number: 4,608,408

[45] Date of Patent: Aug. 26, 1986

[54] PHENOL-HCHO-RESORCINOL RESINS FOR USE IN FORMING FAST CURING WOOD LAMINATING ADHESIVES

[75] Inventors: Richard T. Hood, Murrysville; Raymond L. Bender, Bakerstown, both of Pa.

[73] Assignee: Koppers Company, Inc., Pittsburgh, Pa.

[21] Appl. No.: 726,511

[22] Filed: Apr. 24, 1985

[51] Int. Cl.$^4$ ............................................. C08G 8/24
[52] U.S. Cl. .................................... 524/15; 524/13; 524/503; 524/594; 524/596; 525/58; 528/1; 528/143; 528/147; 528/155; 428/529
[58] Field of Search .................... 528/143, 147, 155; 524/13, 15, 503, 594, 596; 525/58; 428/529

[56] References Cited

U.S. PATENT DOCUMENTS

| | | | |
|---|---|---|---|
| 2,614,096 | 10/1952 | Spahr | 528/147 X |
| 3,328,354 | 6/1967 | Dietrick | 528/143 X |
| 3,389,125 | 6/1968 | Dietrick et al. | 528/143 X |
| 3,607,598 | 9/1971 | LeBlanc et al. | 525/58 X |
| 3,634,276 | 1/1972 | Kreibich et al. | 524/15 X |
| 3,637,547 | 1/1972 | Orth | 524/13 |
| 3,793,113 | 2/1974 | Pearson | 524/15 X |
| 3,929,695 | 12/1975 | Murata et al. | 528/147 X |
| 4,124,554 | 11/1978 | Fry | 524/503 X |
| 4,238,379 | 12/1980 | Reinhart | 524/503 X |
| 4,269,949 | 5/1981 | Hickson et al. | 525/58 |
| 4,373,062 | 2/1983 | Brown | 524/596 X |
| 4,425,178 | 1/1984 | Grendon | 524/596 X |

*Primary Examiner*—Howard E. Schain
*Attorney, Agent, or Firm*—Daniel J. Long; Herbert J. Zeh, Jr.

[57] ABSTRACT

A phenol-resorcinol-formaldehyde resin and a method for making the same. In this method phenol and formaldehyde at an initial pH of 8.5 to 9.2 are reacted in the presence of a sodium sulfite catalyst. The reaction mixture is heated and refluxed until it has a viscosity of u-v on the Gardner bubble test. Additional resorcinol is added to the mixture and refluxing is continued until it has a viscosity of 30 to 100 Garner sections. The reaction mixture is diluted with a water miscible solvent to obtain a resin solution having a solids content of about 40 to 60 percent by weight and a viscosity of 2.0 to 3.5 poise. An alkali metal carbonate material in the amount of 4 to 8 percent by weight of the resin is added to make adhesives including this resin fast curing. Fumed silica is also added to the resin solution by means of high shear apparatus to make the solution thixotropic.

8 Claims, 2 Drawing Figures

PHENOL-HCHO-RESORCINOL RESINS FOR USE IN FORMING FAST CURING WOOD LAMINATING ADHESIVES

FIELD OF THE INVENTION

The present invention relates to phenolic resins which are used in forming adhesives and, in particular, to phenol-resorcinol-formaldehyde resins which are used in forming fast curing wood laminating adhesives.

BRIEF DESCRIPTION OF THE PRIOR ART

Phenolic resin adhesives are well known for their exceptional strength and durability. Resins for use in such adhesives are commonly prepared by the alkaline condensation of formaldehyde with phenol, resorcinol or combinations of the two. The use of ammonia and amines as condensation catalysts has been common practice.

Resorcinol-formaldehyde resins have been used as adhesives to cure at room temperature under neutral pH conditions. Such adhesives are widely used in the manufacture of laminated timbers, roof trusses, boat structures and like wood products.

Resorcinol is the only polyhydric phenol used to any significant extent directly in the preparation of resin adhesives. In general, of the phenolic resins, only those containing resorcinol are commercially important for adhesive applications requiring room temperature setting or curing. The resorcinol-containing adhesives also have the advantage of being waterproof and durable. Because of its cost, however, the use of resorcinol has been restricted from many applications. As a compromise between cost and performance, resorcinol modified phenol-formaldehyde resins were developed.

Conventionally, the preparation of a resorcinol-modified phenol-formaldehyde adhesive involves forming a solution of a water-soluble, fusible phenol-resorcinol-formaldehyde resin and making an adhesive mix therefrom by adding to the resin solution a methylene donor which acts to cure the resin to a cross-linked, insoluble, infusible state. Common methylene donors or hardeners are aqueous formaldehyde, paraformaldehyde, hexamethylenetetramine and the like. In addition to hardeners, the adhesive mix generally contains fillers, i.e., inert materials added to increase the weight of the mix; and extenders, i.e., inert materials which lessen the cost without reducing the valuable properties of the adhesive. Common extenders include walnut shell flour, wood flour, bark flour, asbestos and cellulosic fibers. The curing tine of a particular adhesive mix is often adjusted with a catalyst or modifier.

Alkali metal hydroxides are commonly used to speed the cure for water-proof adhesives in wood laminating. The degree to which cure time can be conventionally reduced, however, is limited as there is a point where the metal hydroxides solubilize the cured adhesives and the bond is no longer waterproof.

SUMMARY OF THE INVENTION

We have found that the metal carbonates, surprisingly and unexpectantly, do not solubilize the cured adhesive and therefore allow for faster curing resins than is possible with metal hydroxides. In the method of the present invention, phenol and formaldehyde are reacted at an initial pH of from 8.5 to 9.0 in the presence of a sodium sulfite catalyst. This catalyst is present in the amount of 0.04–0.09 mole per mole of formaldehyde. The reaction mixture is then heated to reflux until the mixture has a viscosity of form u to v on the Gardner bubble test. Additional resorcinol is then added and reflux continues until the resin has a consistency of from 30 to 100 Gardner seconds. The resin is then diluted with a water miscible solvent to give a solution having a solids content of from 40 to 60 percent by weight and a viscosity of from 2.0 to 3.5 poise. Generally simultaneously with the addition of the water miscible solvent an alkali metal carbonate is added to the resin in the amount of 4 to 8 parts by weight alkali metal carbonate to 100 parts resin solution. If the pH of the resin is not already at least 7.5, it is adjusted to at least 7.5. A thixotropic resin may be obtained by adding fumed silica to the resin solution in the amount of 2 parts or more by weight to 100 parts of resin solution by means of high shear equipment such as a SONOLATOR.

BRIEF DESCRIPTION OF THE DRAWINGS

The invention is further described with reference to the attached drawings in which.

DETAILED DESCRIPTION

Figure 1:
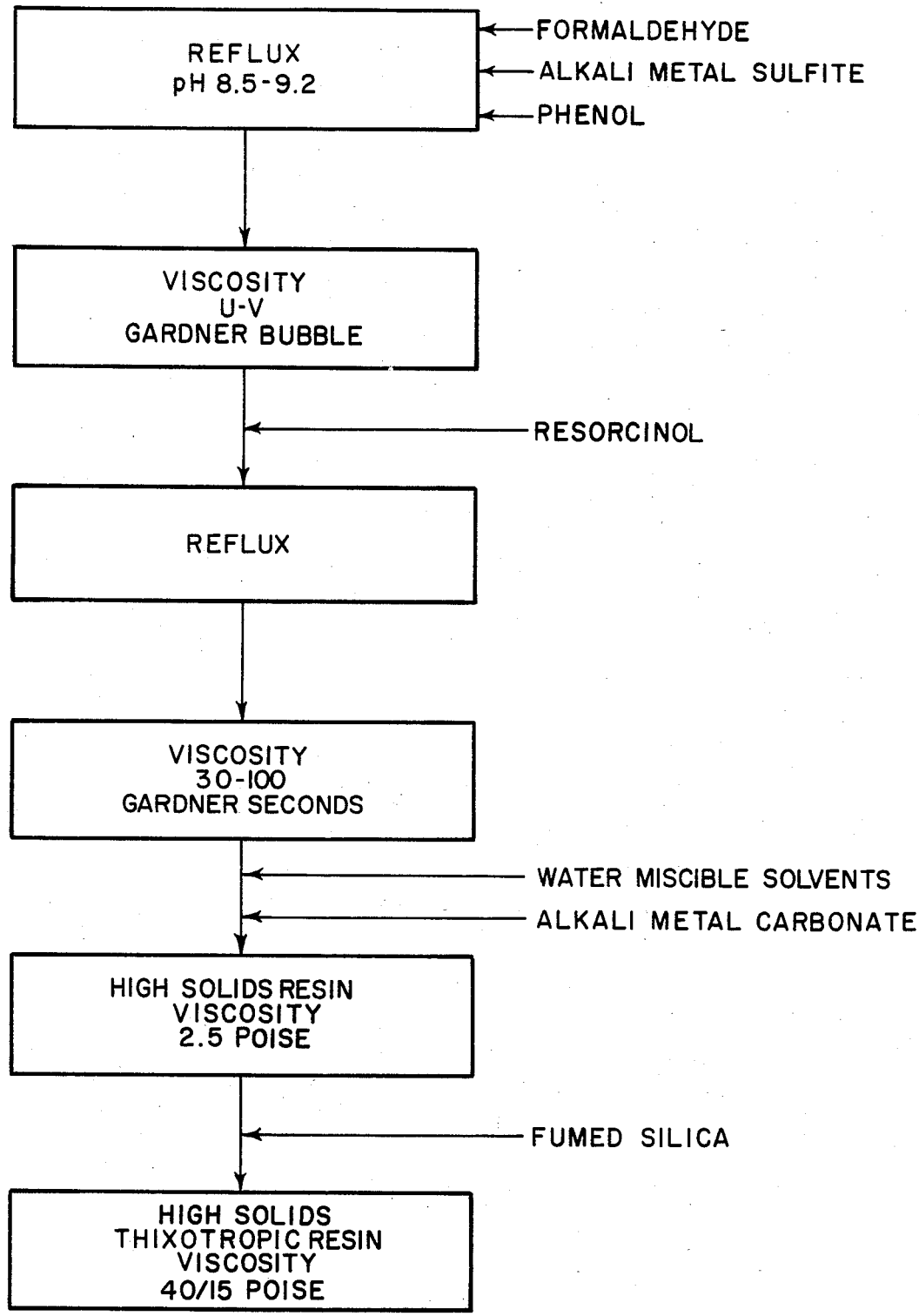
FIG. 1 is a flow diagram of a process which is a preferred embodiment of the present invention.

Referring to FIG. 1, a water soluble, fusible phenol-resorcinol-formaldehyde resin is formed having a composition comprising 50–95 moles phenol and 5–50 moles resorcinol per 100 moles of total phenolic compound and 0.55–0.75 mole of formaldehyde for each mole total phenolic compound. The resin is made by reacting phenol and all of the formaldehyde in the presence of 0.04–0.09 mole of an alkali metal sulfite catalyst per mole of formaldehyde and refluxing the reaction mixture until the mixture has attained a viscosity of u-v Gardner letter. Resorcinol is then added to the reaction mixture. Refluxing is continued until the resin has a constant viscosity of 30–100 Gardner seconds. To prepare the resin for use in adhesive formulations, it is diluted with a water miscible solvent to give a solution having a solids content of 48% by weight and a viscosity of about 2.5 poise. An alkali metal carbonate is added substantially simultaneously with the water miscible solvent in the amount of 6 parts by weight per 100 parts of resin. Potassium carbonate is the preferred alkali metal carbonate for this purpose. Fumed silica in the amount of 2 parts by weight per 100 parts resin solution is then stirred into the resin to wet it after which a high shear SONOLATOR is used to mix it with the resin to form a high solids thixotropic resin having a viscosity of about 40/15 poise.

The phenol-resorcinol-formaldehyde resin solution is mixed with a hardener comprising paraformaldehyde or paraformaldehyde in one of its higher polymeric forms at a pH of about 9.5 along with conventional fillers and extenders as desired to give the novel adhesive. This hardener could be incorporated in a slurry. One slurry which has been found not to separate consists of paraformaldehyde in the amount of 45.1% by weight, nut shell flour in the amount of 39.2%, polyvinyl alcohol in the amount of 9.8% and ATTOGEL 40 in the amount of 5.7%. The range of polyvinyl alcohol in such a slurry could be from about 5–20%. The amount of ATTOGEL 40 could be from about 3–11%. At least about 3% is needed to keep the slurry from separating. If more than 11% is added the slurry becomes too thick to flow.

The mole ratios of the phenolic compounds varies from 50–95 moles of phenol to 5–50 moles of resorcinol per 100 moles of total phenolic compounds. The resorcinol enhances the reactivity of the resin. It is, therefore, necessary to have a minimum of about 5% resorcinol present. When the resin contains an insufficient amount of resorcinol, the temperature required for curing rises considerably, and if the resorcinol is omitted entirely, curing temperatures of 240° F. and higher are required in the absence of a strong catalyst. If more than the maximum amount of resorcinol is used, the cost of the resorcinol component is a detriment. Thus, to use more than 50% resorcinol to form an adhesive having a solids content of 40–60% would be economically disadvantageous.

The mole ratio of formaldehyde to the total phenolic portion of the resin is 0.55–0.75 mole per mole of phenolic component. If an excess is used, stability or the resulting resin is impaired which adversely effects both pot life and washability of the adhesive prepared therefrom. There must be a minimum amount of formaldehyde present sufficient to effect substantial condensation of the phenol portion of the resin.

An alkali metal sulfite is required to catalyze the initial condensation reaction. The amount of alkali metal sulfite should be sufficient to produce a pH of about 8.5–9.2. The amount of sulfite, based upon a mole ratio of sulfite to formaldehyde, must be 0.05–0.09 mole of sulfite catalyst per mole of formaldehyde. If less than 0.04 mole of sulfite is used, there is insufficient catalyst to advance the condensation of the resin to the required degree and adhesives prepared therefrom have poor gluing properties, particularly with respect to delamination. If an amount of sulfite greater than 0.09 mole is used, there are undesirable side reactions between the sulfite and the formaldehyde which tend to prevent condensation of the phenol and formaldehyde.

The alkali metal sulfite catalyst useful in the present invention include the sodium potassium and lithium sulfites. Sodium sulfite, being the most economical and the most readily available, is preferred. The bisulfites of the alkali metals are equivalent to sulfites if used in an equivalent amount on an $SO_3$ basis. It has been found that other alkalis such as sodium hydroxide and the like could not be used to prepare the novel resins of the present invention.

The general procedure for preparing the novel resin is as follows. Formaldehyde (usually as a 37 percent aqueous solution) is mixed with the alkali metal sulfite catalyst and the mixture is heated to dissolve the catalyst. For ease of operation this is done before the addition of the phenol, although the phenol can be added initially before dissolving the catalyst. The phenol is charged to the reaction mixture with the pH of the mixture being maintain between 8.5 to 9.2 and the reaction mixture is then refluxed until a viscosity of u-v Garner letters is obtained. The extent of condensation is conveniently determined by following the viscosity during condensation.

The advancement of the condensation between the phenol and formaldehyde to a viscosity of u-v Garner letters is necessary in order to obtain the unique properties of the resin and resin adhesive of the invention. This high degree of condensation, which is unique in the preparation of phenol-resorcinol-formaldehyde resins, effectively ties up the available phenol, thereby avoiding the odor problems that have plagued the art. The high degree of phenol condensation (prior to the resorcinol addition) provides an extremely reactive resin which can be formulated into an adhesive having a long pot life as well as rapid curing characteristics. As noted above, the advancement of the phenol-formaldehyde condensation is made possible by the use of the sulfite catalyst.

It is important for purposes of the present invention to complete the advancement of the phenol-formaldehyde portion of the resin to the above indicated viscosity before all of the resorcinol is added. Ordinarily, it is convenient to condense phenol and formaldehyde until the critical viscosity of u-v Gardner letters is reached and thereafter add the resorcinol. Excellent resins can also be made by adding the resorcinol continuously or incrementally after the phenol-formaldehyde condensation has been advanced to a viscosity of 1.25 poises. Using continuous or incremental addition at lease the last 25 weight percent of the resorcinol could be added after a viscosity of u Gardner letter poises has been attained. Using the incremental technique, resorcinol is conveniently added in three or four increments. After the addition of resorcinol is complete, refluxing is continued until the reaction mixture reaches a constant viscosity, which is in the range of 30–100 poises.

The viscosity of the resin solution thus prepared is extremely high compared to the normal glue viscosity of adhesive mixes. To make a resin solution useful in adhesive formulations, the resin, prepared as described hereabove, is diluted with water or any water miscible solvent conventional in the adhesive art. Particularly useful are mixed solvents comprising water, lower aliphatic alcohols, and glycols. One useful solvent solution is a mixture of ethylene glycol, ethyl alcohol and water in a ratio of 15:15:70 parts by weight. Ordinarily, the resins of the invention are diluted with one of these solvent systems to a viscosity of about 2.5 poise.

Figure 2:
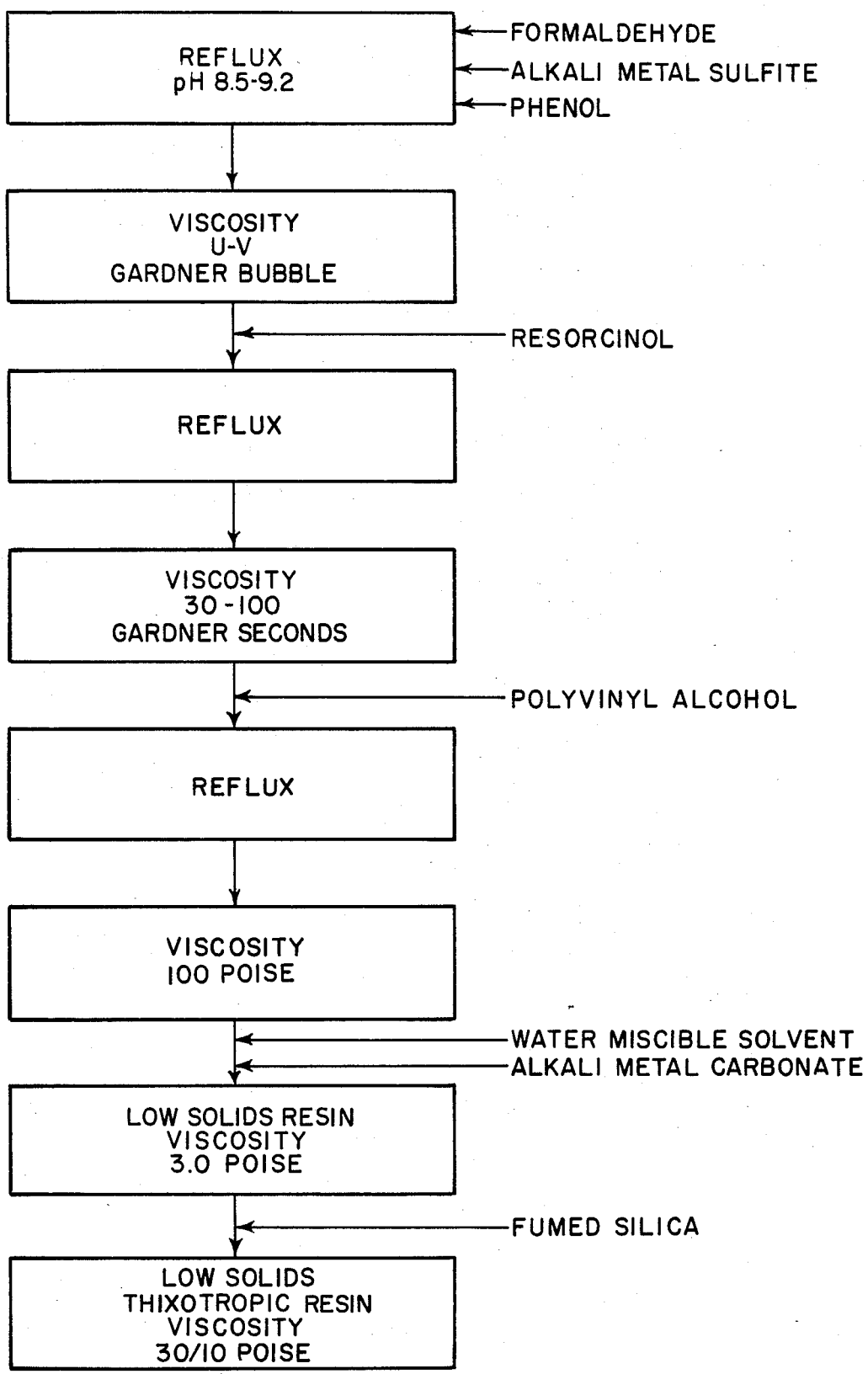
FIG. 2 is a flow diagram of a process which is an alternate embodiment of the present invention.

Referring to FIG. 2, in the alternate embodiment of the invention, formaldehyde and phenol are reacted in the presence of an alkali metal sulfite catalyst in the manner described above. Also in the manner described above, the reaction mixture is heated to reflux until the mixture has a viscosity of from u-v on the Gardner bubble test after which refluxing continues until the viscosity is 30–100 Gardner seconds.

At this point this embodiment differs from the one described above in that polyvinyl alcohol is added and fluxing is continued until viscosity is about 100 poise.

In the manner described in the first embodiment, a water miscible solvent and an alkali metal carbonate are added to produce a low solids resins having a viscosity of about 3.0 poise. Fumed silica is then added in a manner described in the first embodiment to produce a low solids thixotropic resin having a viscosity of about 30/10 poise.

The adhesive of the invention is prepared by mixing the resin solution, adjusted to the desired viscosity as described hereinabove, with paraformaldehyde hardener at a pH of 7.5–9.5 along with suitable fillers and extenders if desired.

In order to provide the long pot life characteristic of the adhesive of the invention, it is necessary to use as a setting agent paraformaldehyde, either as such, or as one of its higher polymers commonly referred to as alpha-polyoxymethylene and beta-polyoxymethylene. The higher polymers of paraformaldehyde are easily prepared by heating a paraformaldehyde to a temperature of approximately 100° C., preferably in the presence of an acid catalyst, such as oxalic acid or a Lewis acid. The paraformaldehyde or polyoxymethylene is added to the adhesive mix in an amount sufficient to convert the resin into a water-insoluble, infusible state. The minimum amount required is that sufficient to provide a total formaldehyde (including that initially condensed with the resin) to total phenolic compound mole ratio of greater than 1:1, preferably in the range of 1.3 to 2 moles of total formaldehyde to one mole of total phenolic compound.

The paraformaldehyde is conveniently added as a hardener portion of the adhesive mix along with the conventional extenders and fillers, such as walnut shell flour, wood flour, and the like. Prior to the addition of the hardener portion, the pH of the adhesive mix is adjusted to 7.5 to 9.5, preferably by the addition of 50 percent aqueous caustic. If the pH of the adhesive mix is less than 7.5, the rapid curing characteristics are not attained. If the pH is greater than 9.5, the pot life of the adhesive is drastically reduced.

The bonding characteristics of phenol-resorcinol-formaldehyde resins and adhesives are conventionally evaluated by a compression shear test (ASTM-D-905) and a vacuum pressure delamination test (ASTM-D-2559). The numerical results of these tests depend upon the type of wood to be bonded. On Douglas fir compression sheer tests of bonds made using the adhesive of the invention shows 80–95 percent wood failure. The wood failure on Southern pine is 80–95 percent. In both cases these results are considered to be excellent. The bond provided by the adhesives of the invention shows, according to the vacuum pressure delamination test, less than one percent delamination for Douglas fir and less than three percent delamination for Southern pine. Such resins and adhesives were also found to cure significantly faster than conventional phenol-resorcinol-formaldehyde resins and adhesives.

Our invention is further illustrated by the following examples:

EXAMPLE 1

A phenol-resorcinol-formaldehyde resin is prepared according to the following charge schedule:

| Charge | Moles | Pounds |
| --- | --- | --- |
| Formaldehyde (37.0%) | 35.98 | 2920 |
| Sodium Sulfite | 2.54 | 320 |
| Phenol UPS (90%) | 41.98 | 4390 |
| Resorcinol, Tech. | 17.98 | 1980 |
| AEROSIL 200, Fumed Silica | — | 153 |

The ingredients are added in the following ratio:

| Ingredients: | Mole Ratio |
| --- | --- |
| Phenol:resorcinol:formaldehyde | 70:30:60 |
| Formaldehyde:sodium sulfite | 1:0.071 |

Formaldehyde is charged to a 1000 gallon reactor fitted with a pump for agitation, to which the sodium sulfite is gradually added. The agitator is commenced and the mixture maintained at a temperature of about 30° C. for 30 minutes. The phenol is charged to the reactor and the pH is determined and formed to be 8.9. The mixture is heated to reflux and at various stages of approximately 15 minute intervals the viscosity changes are noted and refluxing continued until the viscosity is in a range of u-v on a Gardner bubble-tube viscosimeter. Resorcinol is added and reflux is continued until a constant viscosity is obtained over a period of 60 minutes which is at a viscosity of 45 seconds by Garner bubble-tube. The reaction mixture is cooled and diluted with 580 pounds of ethyl alcohol, 190 pounds of ethylene glycol, 2880 pounds of water and 600 pounds of a 47% potassium carbonate solution to a vicosity of 2.5 poise at 23° C. and a pH of 8.9. After the resin is adjusted for viscosity and pH, 153 pounds AEROSIL 200 (fumed silica) was added and the mixture was agitated for thirty minutes. The mixture is then recirculated through a SONOLATOR until the AEROSIL 200 is uniformly dispersed. The resin viscosity is 120 poise at 10 rpm as measured in a Brookfield Viscosimeter.

The resin prepared by the above procedure should have a gel time of about 200 minutes when 100 parts is treated with a setting agent comprised of heat treated paraformaldehyde (polyoxymethylene) in 8 parts and walnut shell in 12 parts.

EXAMPLE 2

Following the procedure of Example 1, with the exception that polyvinyl alcohol is added to thicken the resin and additional water is added to adjust viscosity, a lower cost resin is prepared according to the following formulation.

| Charge | Moles | Pounds |
| --- | --- | --- |
| Formaldehyde (37%) | 35.98 | 2920 |
| Sodium Sulfite | 2.54 | 320 |
| Phenol USP (90%) | 41.98 | 4390 |
| Resorcinol, Tech. | 17.98 | 1980 |
| Polyvinyl Alcohol | — | 125 |
| Fumed Silica, AEROSIL 200 | — | 200 |

The procedure of Example 1 is modified such that after resorcinol is added and a constant viscosity is obtained the polyvinyl alcohol is added and reflux continued to a constant viscosity which is 110 poise.

The reaction mass is cooled and diluted with 580 pounds of ethyl alcohol, 190 pounds of ethylene glycol, 2430 pounds of water and 600 pounds of 47% potassium carbonate solution to a viscosity of 4.4 poise at 23° C. and a pH of 8.0. AEROSIL 200 is added and the mixture is recirculated through a SONOLATOR until the AEROSIL is uniformly dispersed. The resin viscosity is 130 poise at 10 rpm as measured on a Brookfield Viscosimeter.

The resin should have a gel time of 190 minutes when 100 parts by weight is treated with 20 parts of a setting agent comprised of heat treated paraformaldehyde (polyoxymethylene) in 8 parts and walnut shell flour in 12 parts.

EXAMPLE 3

A compression shear test (ASTM-D-905) was performed on three laminated Douglas Fir samples. In the first of these samples (Sample 1) an adhesive as was described above was used which was formed from a phenol-resorcinol-formaldehyde resin which contained 4 parts by weight potassium carbonate per 100 parts resin. The second of these samples (Sample II) was an adhesive as was described above which contained 6 parts by weight potassium carbonate per 100 parts resin. The third of these samples (Sample III) was a conventional adhesive which contained 5 parts conventional sodium hydroxide per 100 parts resin. These samples were subject to pressure and that pressure was measured at certain time intervals. Percent wood failure, percent delamination and minimum mix gel time were also measured. The temperature was 50° F. (Lower temperatures are not recommended for use). The results of this test are summarized on the following Table I.

TABLE I

| Mix Gel Time, Min. | Sample I 369 | Sample II 314 | Sample III 311 |
|---|---|---|---|
| Time | p.s.i. - percent wood failure/percent delamination | | |
| 6 Hours | 560-5/0 | 718-0/0 | 568-20/0 |
| 7 Hours | 1049-43/0 | 1013-61/0 | 690-8/0 |
| 8 Hours | 1021-61/0 | 1089-67/0 | 997-47/0 |
| 9 Hours | 1129-82/0 | — | 790-31/0 |
| 26 Hours | 1011-89/0.8 | 1127-85/0.7 | 1105-88/27.2 |

EXAMPLE 4

A phenol-resorcinol-formaldehyde resin is prepared according to the following charge schedule:

| Charge | Moles | Pounds |
|---|---|---|
| Formaldehyde (37.0%) | 35.98 | 2970 |
| Sodium Sulfite | 2.54 | 320 |
| Phenol USP (90%) | 41.98 | 4448 |
| Resorcinol, Tech. | 17.98 | 1980 |
| AEROSIL 200, Fumed Silica | — | 200 |

The ingredients are added in the following ratio:

| Ingredients: | Mole Ratio |
|---|---|
| Phenol:resorcinol:formaldehyde | 70:30:60 |
| Formaldehyde:sodium sulfite | 1:0.071 |

Formaldehyde is charged to a 1000 gallon reactor fitted with a pump for agitation to which the sodium sulfite is gradually added. The agitator is commenced and the mixture maintained at a temperature of about 30° C. for 30 minutes. The phenol is charged to the reactor and the pH is determined and found to be 8.9. The mixture is heated to reflux and at various stages of approximately 15 minute intervals the viscosity changes are noted and refluxing continues until the viscosity is in a range of u-v on a Gardner bubble-tube viscosimeter. Resorcinol is added and reflux is continued until a constant viscosity is obtained over a period of 60 minutes which is at a viscosity of 45 seconds by Gardner bubble-tube. The reaction mixture is cooled and diluted with 580 pounds of ethyl alcohol, 190 pounds of ethylene glycol, and 1606 pounds of water and 445 pounds of 47 percent potassium carbonate solution to a viscosity of 4.34 poise at 23° C. and a pH of 8.0. After the resin is adjusted for viscosity and pH 200 pounds of AEROSIL 200 (fumed silica) is added and the mixture is agitated for thirty minutes. The mixture is then recirculated through a SONOLATOR until the AEROSIL 200 is uniformly dispersed. The resin viscosity is 90 poise at 10 rpm as measured in a Brookfield viscosimeter.

The resin prepared by the above procedure should have a gel time of about 200 minutes when 100 parts are treated with a setting agent slurry comprised of 2 parts water and 8.6 parts paraformaldehyde, 7.4 Pecan shell flow, 1.9 polyvinyl alcohol and 1.1 attapoltite clay.

It will be appreciated that a method for making an improved, fast curing adhesive and a method for making its resin has been described. Although the invention has been described with some particularly, it is to be understood the present disclosure has been made only as an example and that the scope of the invention s defined by what is hereafter claimed. In particular, it should be understood that although the use of an alkali metal carbonate curing agent was described in connection with a particular phenol-resorcinol-formaldehyde resin, the use of an alkali metal carbonate curing agent would be similarly efficacious.

What is claimed is:

1. A method for making a soluble, fusible phenol-resorcinol-formaldehyde resin solution, which resin comprises about 50 to 95 moles phenol with about 5 to 50 moles resorcinol per 100 moles of total phenol and resorcinol and about 0.55 to 0.75 moles of formaldehyde for each mole total of phenol and resorcinol, said resin being prepared by the steps comprising:
    (a) reacting said phenol and said formaldehyde at an initial pH of from about 8.5 to 9.2 in the presence of a sodium sulfite catalyst in an amount of about 0.04 to 0.09 mole per mole of formaldehyde;
    (b) then heating the reaction mixture to reflux until the mixture has a viscosity of about u to v on the Gardner bubble test;
    (c) then introducing resorcinol to the reaction mixture and continuing refluxing until the reaction mixture has a constant viscosity of about 30 to 100 Gardner seconds;
    (d) then diluting the reaction mixture with a water miscible solvent to obtain a resin solution having a solids content of about 40 to 60 percent by weight and a viscosity of about 2.0 to 3.5 poise and adding an alkali metal carbonate material in the weight amount of about 4 to 8 percent of the weight of the reaction mixture present at the completion of step (c); and
    (e) then, if the pH of resin solution formed in step (d) is less than about 7.5, adjusting the pH of said resin solution to at least about 7.5.

2. The method recited in claim 1 wherein in step (d) the resin solution formed is a high resin solids solution having a viscosity of about 2.0 to 2.5 poise.

3. The method recited in claim 2 wherein after step (d) fumed silica is added to the resin solution to form a high solids thixotropic resin solution.

4. The method recited in claim 1 wherein between step (c) and (d) polyvinyl alcohol is added to the reaction mixture and refluxing is continued until the viscosity of the reaction mixture is about 95 to 105 poise.

5. The method recited in claim 4 wherein in step (d) the resin solution formed is a low resin solids solution having a viscosity of about 3.0 poise.

6. The method recited in claim 5 wherein after step (d) fumed silica is added to the resin solution to form a low solids thixotropic resin solution.

7. The method recited in claim 1 wherein the alkali metal carbonate material added in step (c) is potassium carbonate.

8. The method recited in claim 1 wherein an adhesive is formed by mixing the completed resin with a hardener slurry comprising polyvinyl alcohol in an amount of about 5 to 20% by weight and attapulgite mineral derivative in an amount of about 3 to 11% by weight with paraformaldehyde and nut shell flour comprising the remainder of said hardener slurry.

* * * * *